US008373321B2

(12) United States Patent
Lee et al.

(10) Patent No.: US 8,373,321 B2
(45) Date of Patent: Feb. 12, 2013

(54) TERMINAL ASSEMBLY FOR MOTOR OF HYBRID VEHICLE

(75) Inventors: Hyeoun Dong Lee, Yongin (KR); Do Hyun Kim, Anyang (KR); Ki Nam Kim, Seongnam (KR); Sam Gyun Kim, Hwaseong (KR); Tack Hwan Kwon, Gyeonggi-do (KR)

(73) Assignees: Hyundai Motor Company, Seoul (KR); Kia Motors Corporation, Seoul (KR); Hyundai Mobis Co., Ltd., Seoul (KR)

( * ) Notice: Subject to any disclaimer, the term of this patent is extended or adjusted under 35 U.S.C. 154(b) by 208 days.

(21) Appl. No.: 12/950,971

(22) Filed: Nov. 19, 2010

(65) Prior Publication Data

US 2011/0215662 A1 Sep. 8, 2011

(30) Foreign Application Priority Data

Mar. 8, 2010 (KR) ........................ 10-2010-0020271

(51) Int. Cl.
*H02K 11/00* (2006.01)

(52) U.S. Cl. ........................................................ 310/71

(58) Field of Classification Search 310/71; *H02K 5/22*
See application file for complete search history.

(56) References Cited

U.S. PATENT DOCUMENTS 5,268,604 A 12/1993 Katakura
6,530,140 B2 3/2003 Maeda et al.
6,914,356 B2 * 7/2005 Yamamura et al. ............ 310/71
6,930,418 B2 * 8/2005 Kobayashi et al. ............. 310/71
7,135,793 B2 11/2006 Seguchi et al.
7,652,402 B2 * 1/2010 Kinoshita et al. ............... 310/71

FOREIGN PATENT DOCUMENTS

JP 2001-025198 1/2001
JP 2003-134758 A 5/2003
JP 2007-135339 A 5/2007
JP 2007259642 A * 10/2007
JP 2008-061305 3/2008
JP 2008-099376 4/2008

OTHER PUBLICATIONS

JP 2007135339 Machine Translation.*
JP 2007-259642 Machine Translation.*

* cited by examiner

*Primary Examiner* — Tran N. Nguyen
*Assistant Examiner* — Thomas Truong
(74) *Attorney, Agent, or Firm* — Edwards Wildman Palmer LLP; Peter F. Corless

(57) ABSTRACT

The present invention features a terminal assembly for a motor of a hybrid vehicle as a wire connection structure of a concentrated winding motor, which can maintain a gap between a plurality of terminals using a clip and a holder in an insulated manner. Such a terminal assembly for a motor of a hybrid vehicle, includes: an open type holder with an open top; a plurality of terminals concentrically arranged and inserted into the holder; and a plurality of clips, each inserted between the terminals in an insulated manner to maintain a gap between the terminals.

15 Claims, 6 Drawing Sheets

100 30 32 34a 34 34b 20 28 26 24 21 22 16 14 15 17 12 10 17 16

TERMINAL ASSEMBLY FOR MOTOR OF HYBRID VEHICLE

CROSS-REFERENCE TO RELATED APPLICATION

This application claims under 35 U.S.C. §119(a) priority to and the benefit of Korean Patent Application No. 10-2010-0020271 filed Mar. 8, 2010, the entire contents of which are incorporated herein by reference.

BACKGROUND

1. Technical Field

The present invention relates to a terminal assembly for a concentrated winding motor such as that found in a hybrid vehicle. More particularly, the present invention relates to a terminal assembly for a motor of a hybrid vehicle having a wire connection structure of a concentrated winding motor and which maintains a gap between a plurality of terminals using a clip and a holder in an insulated manner.

2. Background Art

In general, while a distributed winding motor does not require a wire connection, a concentrated winding motor such as that used in a hybrid vehicle requires a connection between a connection terminal of each terminal and a coil.

There is described in U.S. Pat. No. 5,828,147 a structure in which terminals are inserted into slotted chambers in an insulated manner such that a connection terminal of each terminal is connected to the distal end of a coil located there below. The connection terminal of each terminal, however, is simply inserted into a slot, and thus the connection terminal may be separated from the slot by an impact. Moreover, no insulation or insulation means is provided between the connection terminals, as a result insulation performance is reduced.

There is described in U.S. Pat. No. 6,856,057, U.S. Pat. No. 6,894,410, and U.S. Pat. No. 6,930,418 insulation structures in which a plurality of bus bars are assembled using an insulating holder having a plurality of holding grooves and the bus bars and the insulating holder are covered with resin in an insulated manner. However, as no means for fixing the bus bars is provided in the described structures, the fastening force for the bus bars is weak.

It thus would be desirable to provide an improved terminal assembly for a concentrated winding motor such as that used in hybrid vehicles. It would be particularly desirable to provide such a terminal assembly having a wire connection structure of a concentrated winding motor and which maintains a gap between a plurality of terminals using a clip and a holder in an insulated manner.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention features a terminal assembly for a motor of a hybrid vehicle. Such a terminal assembly improves the terminal assembly structure as a wire connection structure of a concentrated winding motor. In such a terminal assembly, a plurality of terminals are concentrically arranged in a holder and a clip is inserted between the terminals so as to maintain a gap between the plurality of terminals and maintain the insulation distance created by the gap. Also featured is a terminal assembly for a concentrated winding motor as well as terminal assemblies in combination with such concentrated winding motors and/or motors of a hybrid vehicle.

According to one aspect of the present invention, there is featured a terminal assembly for a motor of a hybrid vehicle, Such terminal assembly includes: an open type holder with an open top; a plurality of terminals concentrically arranged and inserted into the holder; and a plurality of clips, each inserted between the terminals in an insulated manner to maintain a gap between the terminals.

In further embodiments, such a terminal assembly includes a multiplicity of clips that are spaced from each other about the circumference of the concentrically arranged terminals. In more particular embodiments, the number of clips N ($N \geqq 2$) is established so as to generally maintain the gap between adjacent terminals within a desired value. Also, such a terminal assembly further includes a multiplicity of terminals concentrically arranged and inserted into the holder.

In yet further embodiments, each of the clips includes a leg portion having a plurality of legs, which legs are to be inserted between the terminals, and a top plate placed on the top of the terminals. The leg portion and the top plate are arranged so as to integral with each other. In more particular embodiments, the leg portion and the top plate are integrally molded with each other. In yet more particular embodiments, at least the leg portion is made of a material having electrically insulative properties appropriate for the intended use.

In another embodiment, the open type holder further includes, a plurality of fixing grooves formed at the top of an inner end thereof at regular intervals in the circumferential direction. Also, each terminal includes a connection terminal extending vertically from each terminal, which connection terminal is inserted into each fixing groove.

In still another embodiment, the open type holder further includes a bottom plate and a plurality of insertion holes formed on the bottom plate thereof at regular intervals in the circumferential direction. With such an arrangement, the leg portion of each clip is inserted into each insertion hole.

In yet another embodiment, the terminal assembly of the present invention further includes an insulating material molded over the top of the clips and the terminals.

In still yet another embodiment, each of the clips further includes separation holes formed on the top plate, which corresponds to the boundary of the leg portion. Such separation holes are formed by punching in a state where the leg portion of the clip is inserted into the terminals.

In a further another embodiment, the terminals include one or more of a U-phase terminal, a V-phase terminal, a W-phase terminal, and an N-phase terminal. Such terminals are formed by a stamping process using a press.

In another aspect of the present invention, there is featured a terminal assembly for a concentrated wiring electric motor. Such a terminal assembly includes an open type holder having an open top, a plurality of terminals concentrically arranged and inserted into the holder, and a plurality of clips. Each of the plurality of clips is inserted between the terminals so as to maintain a gap between adjacent terminals and the clips are circumferentially spaced from each other.

In further embodiments, each of the clips includes a leg portion and a top plate, where the leg portion includes a plurality of legs. When the clips are being inserted, each leg portion is inserted between adjacent terminals and the top plate is disposed on the top of the terminals. In more particular embodiments, the leg portion and the top plate are integrally molded with each other.

In yet further embodiments, the open type holder further includes an inner end and a plurality of fixing grooves formed at a top of the inner end at regular intervals in the circumferential direction and each terminal includes at least one connection terminal that extends vertically from each terminal. At least one connection terminal disposed in a respective fixing groove.

In yet further embodiments, the open type holder further includes a bottom plate and a plurality of insertion holes that are formed in the bottom plate at regular intervals in the circumferential direction. With such a arrangement, the leg portion of each clip is inserted into a respective insertion hole.

In yet further embodiments, such a terminal assembly further includes an insulating material, the insulating material being molded over the top of the clips and the terminals.

In yet further embodiments, each of the clips further includes separation holes that are formed in the top plate, which corresponds to the boundary of the leg portion. Such separation holes are formed by punching when the leg portion of the clip is inserted into the terminals.

In yet further embodiments, the terminals comprise one or more of a U-phase terminal, a V-phase terminal, a W-phase terminal, and an N-phase terminal. In more particular embodiments, the terminals comprise a combination of at least two of the U-phase terminal, the V-phase terminal, the W-phase terminal, and the N-phase terminal.

In yet further embodiments, such a terminal assembly further includes a multiplicity of clips. In more particular embodiments, the multiplicity of clips are spaced from each other about the circumference of the concentrically arranged terminals. In more particular embodiments, there are N clips, where $N \geqq 2$. More particularly the number of clips is established so as to generally maintain the gap between adjacent terminals within a desired value. Also, such a terminal assembly further includes a multiplicity of terminals concentrically arranged and inserted into the holder.

It shall be understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Other aspects and preferred embodiments of the invention are discussed infra.

BRIEF DESCRIPTION OF THE DRAWINGS

For a fuller understanding of the nature of the present invention as well as the above and other features of the present invention, reference is made to the following detailed description taken in conjunction with the accompanying drawing figures. In the figures, reference numbers refer to the same or equivalent parts of the present invention throughout the several figures of the drawing.

Figure 1:
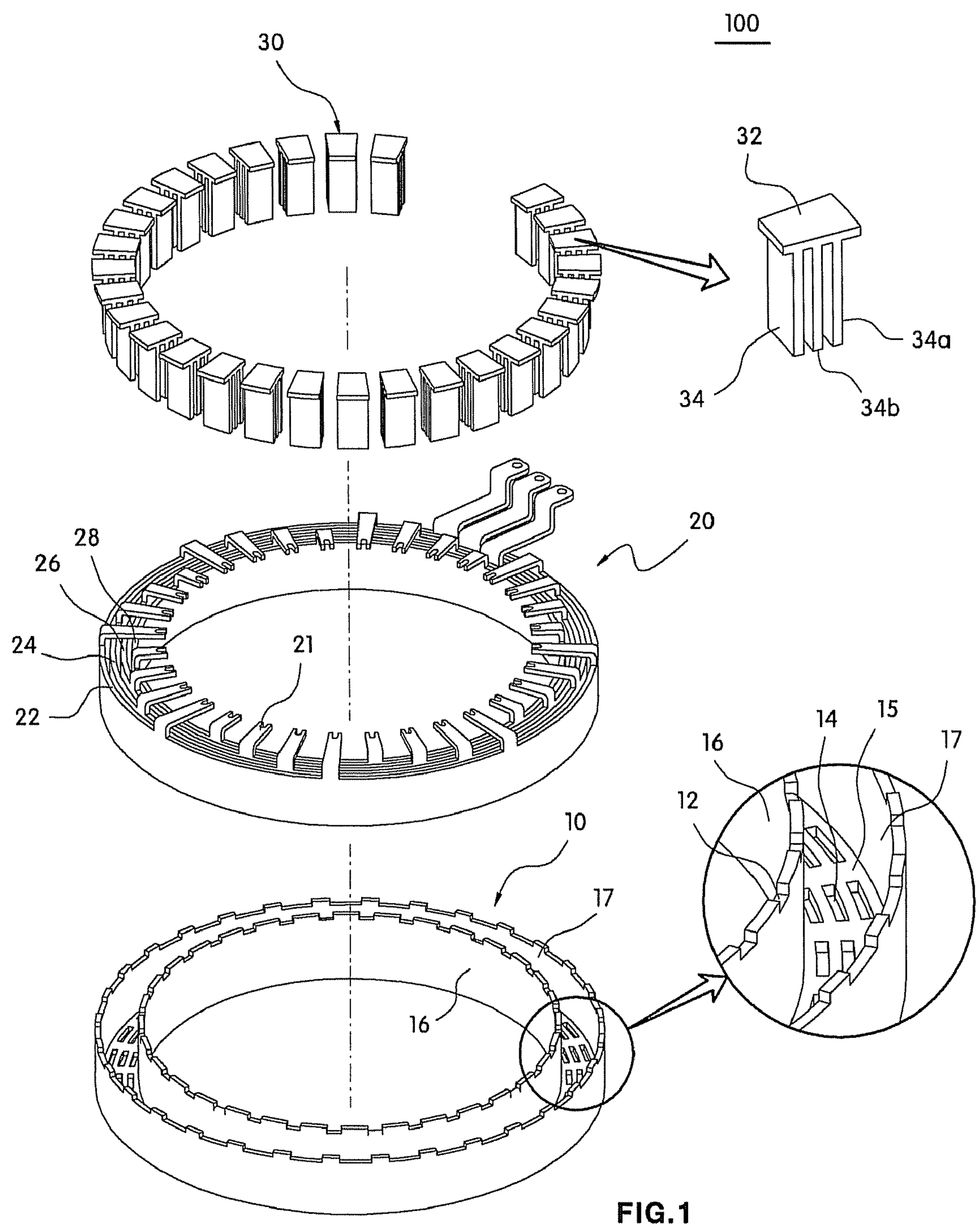
FIG. 1 is an exploded perspective view of a terminal assembly according to the present invention.

Reference numerals set forth in the drawings include reference to the following elements as further discussed below:

| | |
|---|---|
| 10: open type holder | 12: fixing groove |
| 14: insertion hole | 15: bottom plate |
| 16: inner end | 17: outer end |
| 20: terminal | 21: connection terminal |
| 22: U-phase terminal | 24: V-phase terminal |
| 26: W-phase terminal | 28: N-phase terminal |
| 30: clip | 32: top plate |
| 34: leg portion | 36: separation hole |
| 40: insulating material | |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Hereinafter reference will now be made in detail to various embodiments of the present invention, examples of which are illustrated in the accompanying drawings and described below. It is understood that present description is not intended to limit the invention, rather the scope of the present invention shall include the various alternatives, modifications, equivalents and other embodiments, which may be included within the spirit and scope of the invention as defined by the appended claims.

The present invention features a terminal assembly for a concentrated wiring electric motor as well as for an electric motor of a hybrid vehicle. Such a terminal assembly includes an open type holder having an open top, a plurality of terminals concentrically arranged and inserted into the holder, and a plurality of clips. Each of the plurality of clips is inserted between the terminals so as to maintain a gap between adjacent terminals and the clips are circumferentially spaced from each other. In this way, the terminal assembly of the present invention advantageously maintains the insulation distance between the plurality of terminals using a clip and a holder.

In yet further embodiments, such a terminal assembly includes a multiplicity of clips. The multiplicity of clips also are arranged so as to be spaced from each other about the circumference of the concentrically arranged terminals. In more particular embodiments, there are N clips, where $N \geqq 2$. More particularly the number of clips is established so the gap between adjacent terminals is generally maintained within a desired value. Also, such a terminal assembly further includes a multiplicity of terminals concentrically arranged and inserted into the holder.

In further embodiments, each of the clips includes a leg portion and a top plate, where the leg portion includes at least one leg, and more particularly a plurality of legs. Thus, when the clips are being inserted, each leg portion is inserted between adjacent terminals and the top plate is disposed on the top of the terminals. In more particular embodiments, the leg portion and the top plate are integrally molded with each other.

In yet further embodiments, the open type holder further includes an inner end and a plurality of fixing grooves formed at a top of the inner end at regular intervals in the circumferential direction and each terminal includes at least one connection terminal that extends vertically from each terminal. At least one connection terminal is disposed in a respective fixing groove.

In yet further embodiments, the open type holder further includes a bottom plate and a plurality of insertion holes that are formed in the bottom plate at regular intervals in the circumferential direction. With such a arrangement, the leg portion of each clip is inserted into a respective insertion hole.

In yet further embodiments, such a terminal assembly further includes an insulating material, the insulating material being molded over the top of the clips and the terminals.

In yet further embodiments, each of the clips further includes separation holes that are formed in the top plate, which corresponds to the boundary of the leg portion. Such separation holes are formed by punching when the leg portion of the clip is inserted into the terminals.

In yet further embodiments, the terminals comprise one or more of a U-phase terminal, a V-phase terminal, a W-phase terminal, and an N-phase terminal. In more particular embodiments, the terminals comprise a combination of at least two of the U-phase terminal, the V-phase terminal, the W-phase terminal, and the N-phase terminal.

Figure 2:
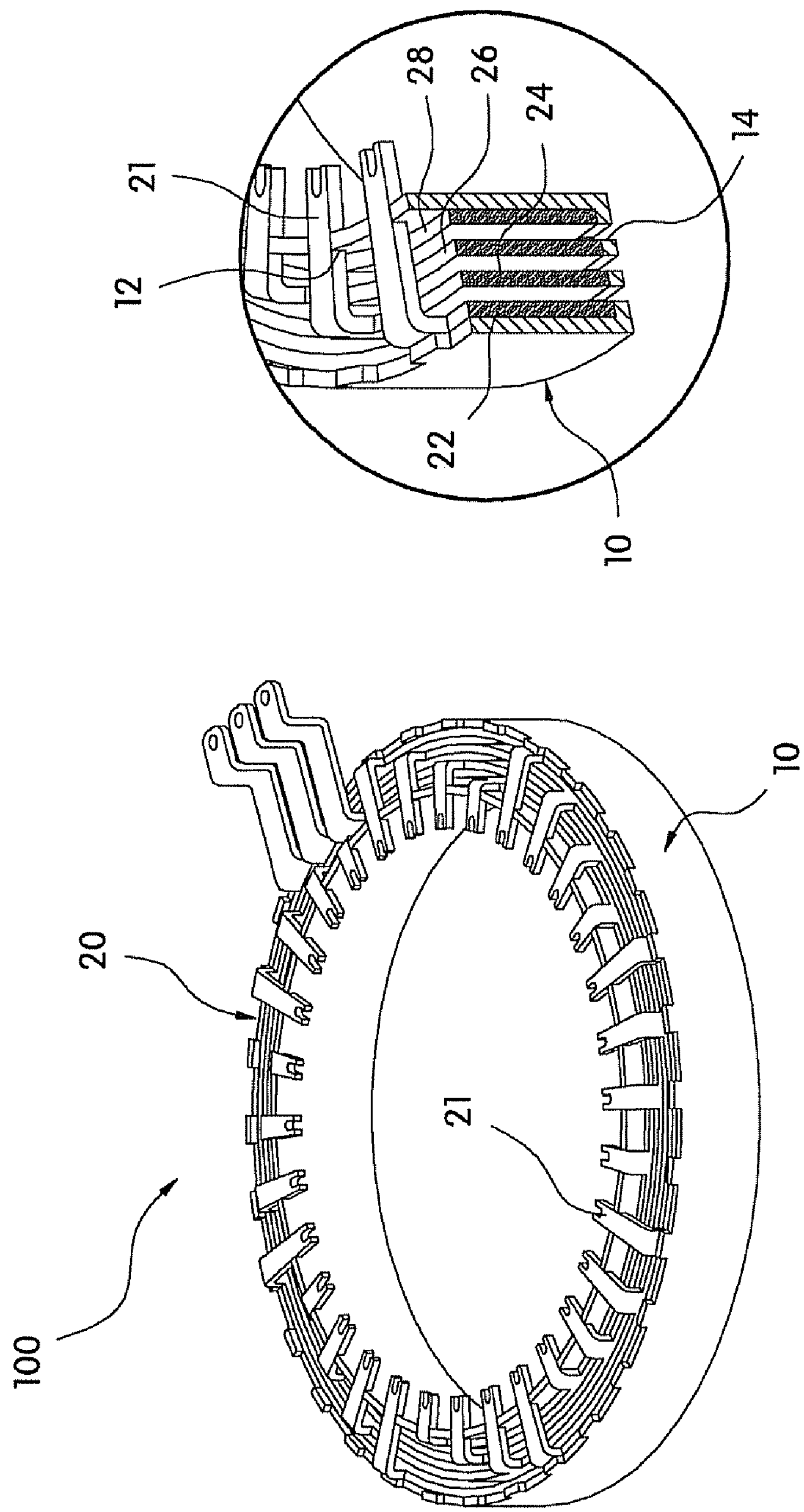
FIG. 2 is a perspective view showing a state in which terminals of the terminal assembly of FIG. 1 are inserted into an open type holder.
Figure 3:
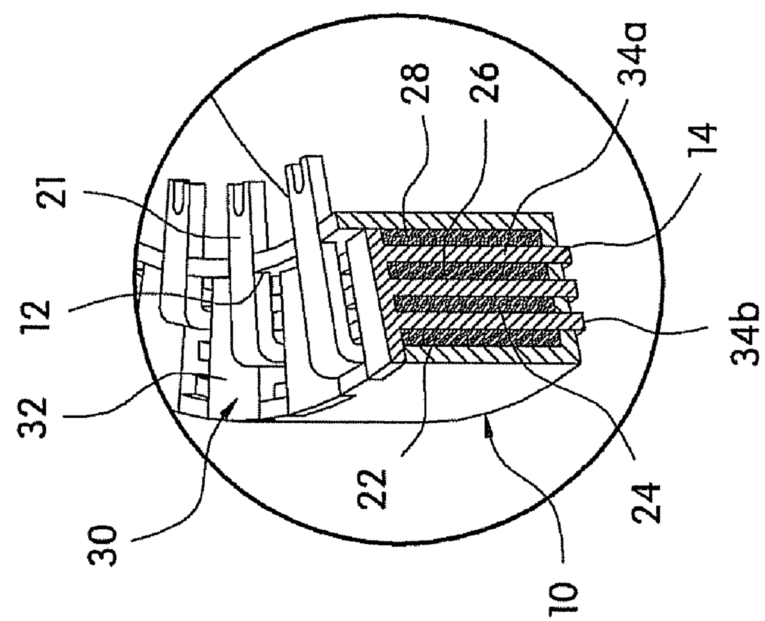
FIG. 3 is a perspective view showing a state in which the terminals of the terminal assembly of FIG. 1 are inserted into the open type holder and secured by a clip.
Figure 3:
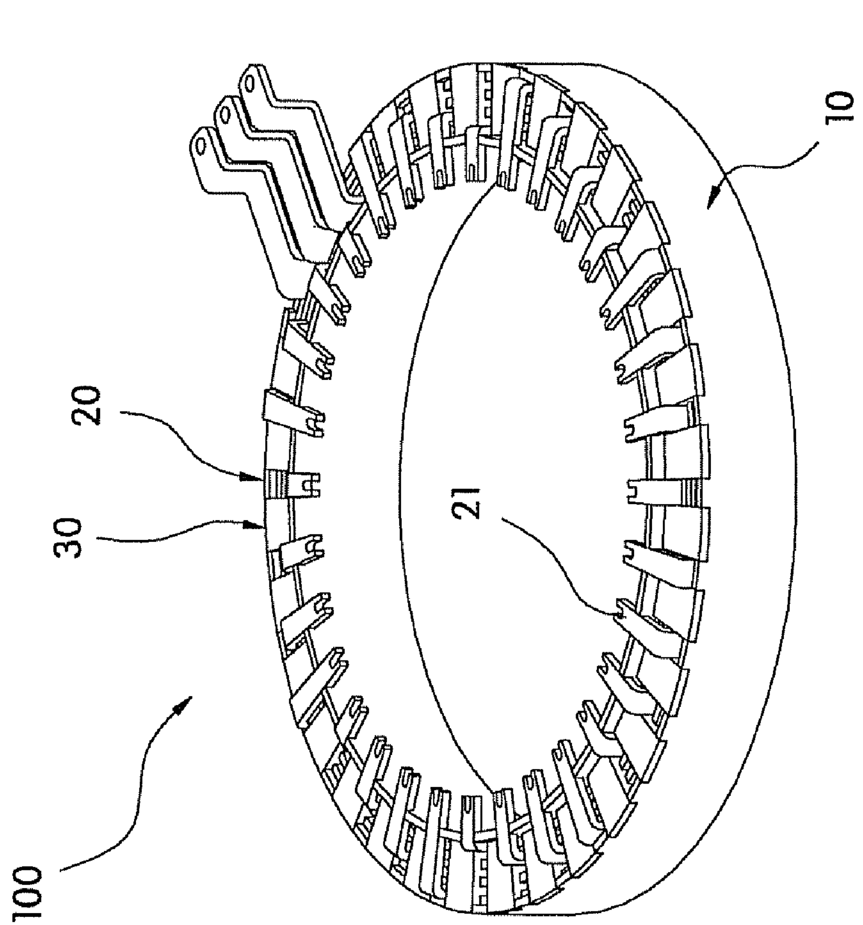

Referring now to FIG. 1, there is shown an exploded perspective view of a terminal assembly 100 according to the present invention, which as descried herein is usable for an electric motor of a hybrid vehicle and/or a concentrated winding electric motor. Referring also to FIGS. 2-3, there is shown a perspective view illustrating a state in which connection terminals 21 of the terminal assembly 100 of FIG. 1 are inserted into an open type holder 10 (FIG. 2), and a perspective view illustrating a state in which the terminals 21 of the terminal assembly 100 of FIG. 1 are inserted into the open type holder 10 and secured by a clip 30 (FIG. 3).

As described herein, the present invention provides a terminal assembly 100 for a motor of a hybrid vehicle as a wire connection structure of a concentrated winding motor used in such a hybrid vehicle, which can maintain the insulation distance between a plurality of connection terminals 21 using a clip 30 and a holder. In such a terminal assembly 100, the clip 30 is inserted and fastened between the terminals 21 and the holder is an open type holder 10 with an open top having a space in which the terminals and the clips are disposed.

The open type holder 10 is a ring-shaped structure which is molded with an insulating material such as plastic. The holder 10 includes a bottom plate 15 having a plurality of insertion holes 14, formed at regular intervals in the circumferential direction, and an inner end 16 and an outer end 17, extending vertically from the ends of the inner and outer circumferences of the bottom plate 15, respectively. A plurality of fixing grooves 12 are formed at the top of the inner end 16, into which each connection terminal 21 of a terminal 20 is inserted.

The clip 30 embodies an insulating material including but not limited to plastic so as to form an insulating member, and in more particular embodiments the clip is molded with an insulating material such as plastic. The clip 30 also is arranged so as to include a leg portion 34 and a top plate 32. The leg portion 34 includes one or more legs 34*a*, a plurality of legs or a multiplicity of legs. The leg portion 34, more particularly the legs 34*a* thereof are inserted between the terminals 20 and so the top plate 32 is placed on the top of the terminals 20. The number of legs making up a leg portion is established so that a leg 34*a* is inserted between each pair of terminals that are adjacent to each other. In yet further embodiments, the leg portion 34 also is inserted between the terminals 21. In yet further embodiments, the leg portion 34 and the top plate 32 are integrally molded with each other.

Preferably, the plurality or multiplicity of clips 30 including the top plate 32 and the leg portion 34, are arranged at regular intervals in the circumferential direction of the open type holder 10, and thus the plurality of clips 30 are formed with the same radius of curvature as the open type holder 10. In more particular embodiments, the plurality or multiplicity of clips 30 also are arranged at regular intervals and so as to be disposed between a pair of terminals 21 when inserted. In further embodiments, the plurality or multiplicity of clips 30 also are arranged at regular intervals and so as to be disposed between one of each pair of terminals 21, between every other pair of terminals, or every other xth pair of terminals were x is an integer ≧3.

The terminal 20 is composed of one or more of a U-phase terminal 22, a V-phase terminal 24, a W-phase terminal 26, and an N-phase terminal 28. In more particular embodiments, terminal 20 is composed of a combination of such a U-phase terminal 22, a V-phase terminal 24, a W-phase terminal 26, and an N-phase terminal 28 or all of such terminals. Each of the terminals 22, 24, 26, and 28 is formed into a ring shape by a stamping process using a press and has a different diameter. The connection terminal 21 that is bent inwardly (i.e., toward inner end 16, is integrally formed at a predetermined position at the top of each of the terminals 22, 24, 26, and 28.

The plurality of terminals 20 such as the U-phase terminal 22, the V-phase terminal 24, the W-phase terminal 26, and the N-phase terminal 28, are inserted into the open type holder 10 and concentrically arranged therein. The connection terminal 21 of each terminal 20 is inserted into the fixing groove 12 formed at the top of the inner end 16 of the open type holder 10, thus preventing the terminals 22, 24, 26, and 28 from moving in the circumferential direction.

The plurality of clips 30 are arranged at regular intervals in the circumferential direction of the terminal 20 in such a manner that the leg portion 34, more specifically the legs 34*a*, of each clip 30 is inserted between the terminals 22, 24, 26, and 28 and, at the same time, so the top plate 32 of each clip 30 is in close contact with the top surface of the terminals 22, 24, 26, and 28. In this way, the inserted leg portion 34 or the legs 34*a* thereof, thus maintain, the insulation distance between the terminals 22, 24, 26, and 28.

In the illustrated embodiment, the leg portion 34 includes a total of three legs 34*a* having the same thickness, which are inserted respectively, between the U-phase terminal 22 and the V-phase terminal 24, between the V-phase terminal 24 and the W-phase terminal 26, and between the W-phase terminal and the N-phase terminal 28. In this way, the insulation distance is maintained between the terminals 22, 24, 26, and 28.

In more particular aspects/embodiments of the present invention, the open type holder the bottom end 34*b* for each leg 34*a* of the leg portion 34 of each clip 30 is inserted into the insertion hole 14 formed in the bottom plate 15 of the open type holder 10, so that each clip 30 is firmly fixed to the open type holder. Such securing of each clip to the open type holder 10 thus makes it possible to prevent the terminals 22, 24, 26, and 28 from moving in the circumferential or radial direction.

Figure 4:
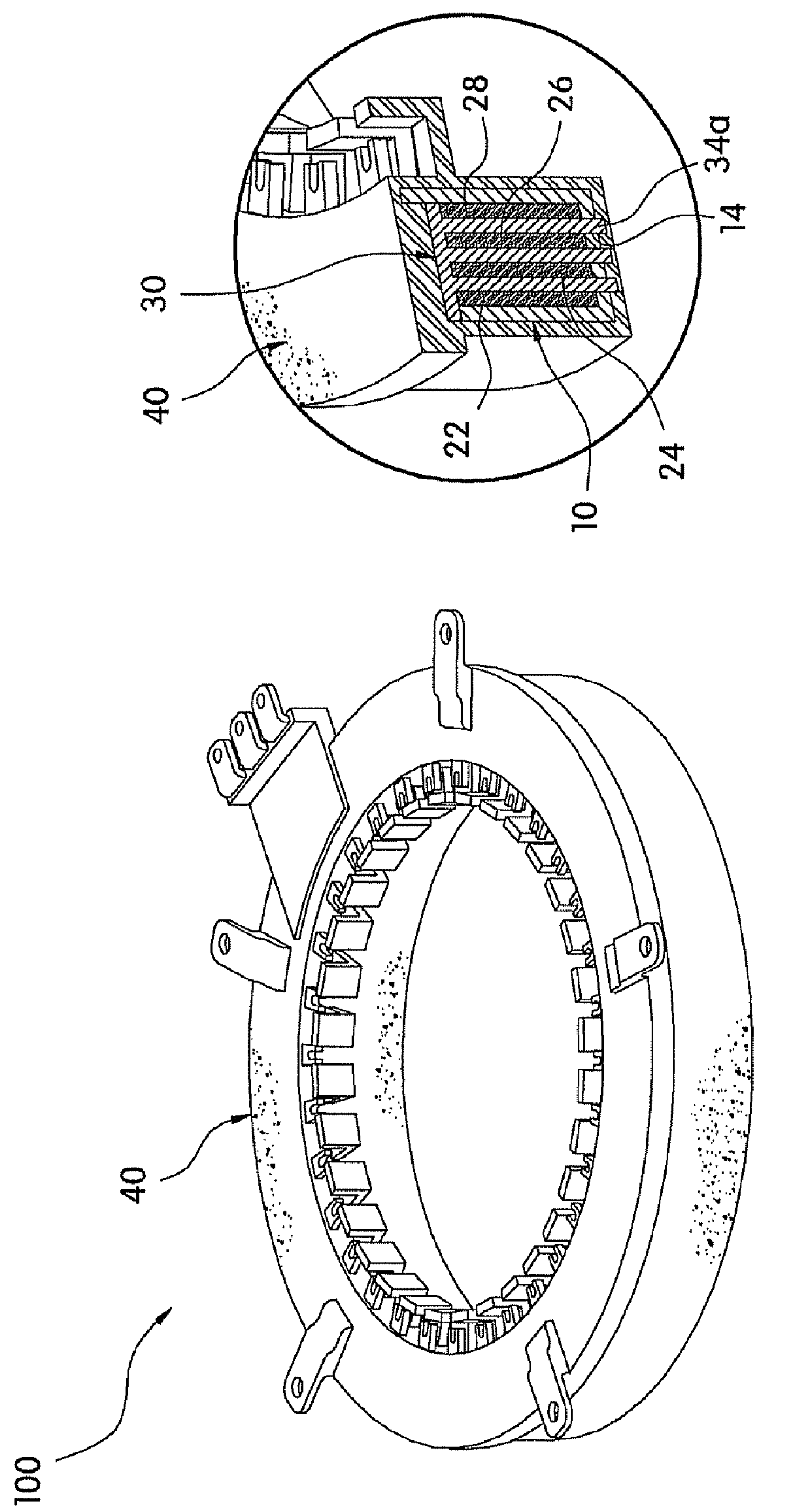
FIG. 4 is a perspective view showing a state in which the terminals of the terminal assembly according to the present invention are secured by the clip and then over-molded with an insulating material.

In further aspects/embodiments of the present invention and referring now to FIG. 4 there is shown a perspective view illustrating a state in which the terminals 20 of the terminal assembly 100*a* according to the present invention are secured by the clip and then over-molded with an insulating material (FIG. 4). According to this aspect/embodiment of the present invention, an insulating material 40 such as epoxy resin or silicone resin is molded over the top of the plurality of clips 30 and terminals 22, 24, 26, and 28 to firmly maintain the gap between the clips 30. In more particular aspects/embodiments, the insulating material 40 also is filled between the terminals 22, 24, 26, and 28, where the plurality of clips 30 are not inserted, This provides additional insulation between the terminals 22, 24, 26, and 28, so as to thereby ensure the insulation between the terminals.

Figure 5:
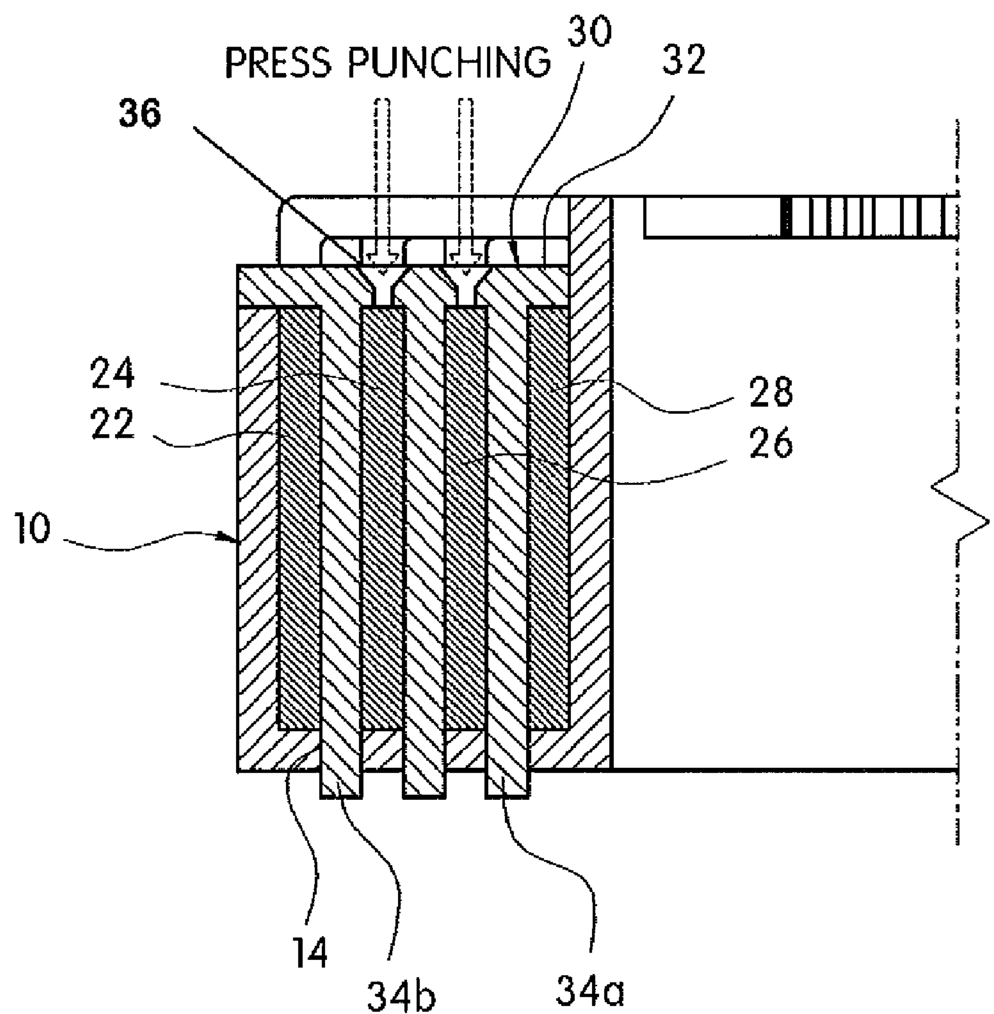
FIG. 5 is a cross-sectional view showing a state in which the terminals of the terminal assembly according to the present invention are secured by the clip and the top surface of each clip is punched out.
Figure 6:
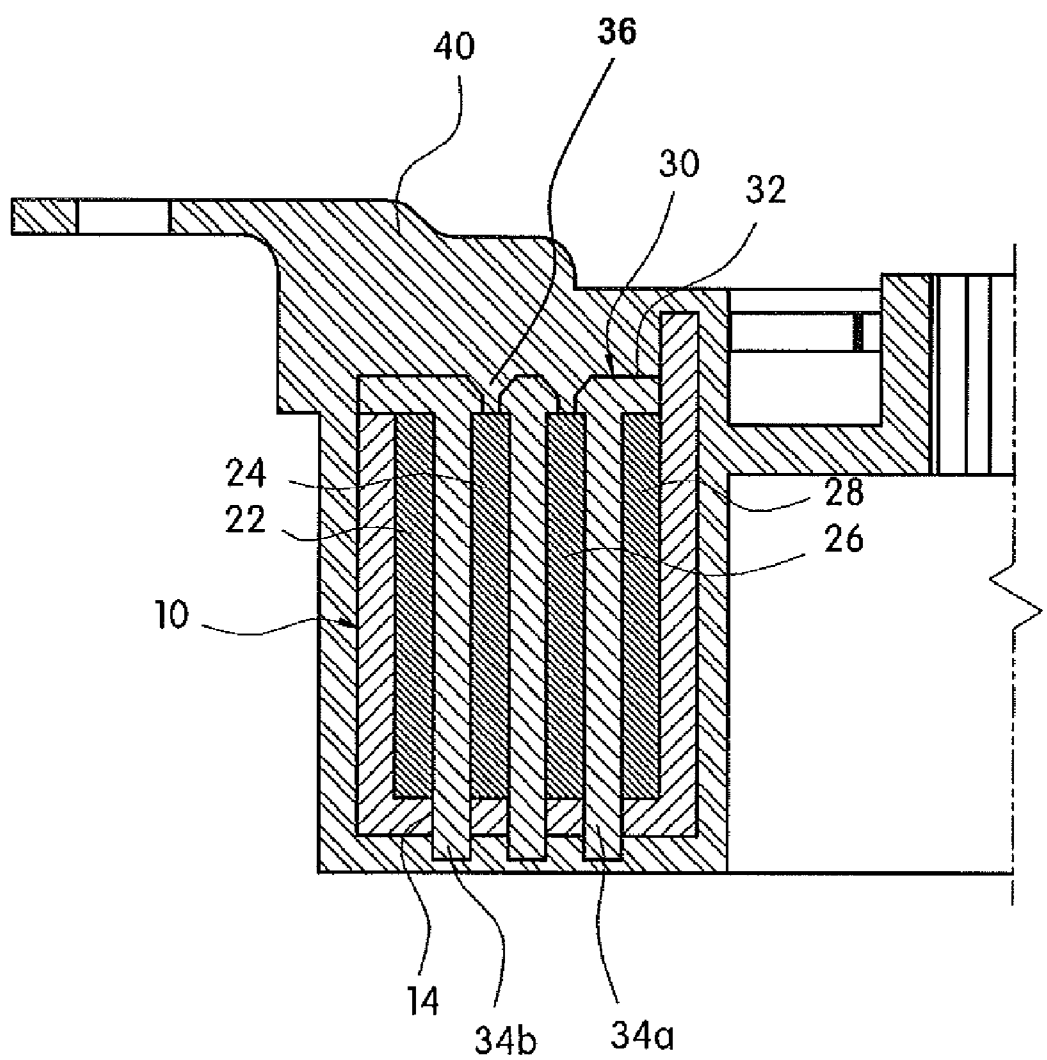
FIG. 6 is a cross-sectional view showing a state in which the clip is punched out and then over-molded with an insulating material.

In further aspects/embodiments of the present invention and referring now to FIG. 5 there is shown a cross-sectional view illustrating a state in which the terminals 22, 24, 26 and 28 of the terminal assembly 100 according to the present invention are secured by the clip and the top surface of each clip is punched out. As shown in FIG. 5, when each clip 30 is inserted between the terminals 22, 24, 26, and 28, the top plate 32 of the clip 30 is pressed by a press and the top surface of the clip 30 is punched out to form separation holes 36.

More particularly, the top surface of the top plate 32, which corresponds to the boundary of each leg 34*a* of the leg portion 34, is punched out when the leg portion 34 is inserted into the terminals 22, 24, 26, and 28, to form the separation holes 36 such that the legs 34*a* of each leg portion 34 are separated from each other.

In further embodiments, the separation holes 36 are further filled with the insulating material 40 during overmolding to increase the contact area between the insulating material 40 and the leg portion 34, thereby more firmly fixing the clip 30.

The connection terminal 21 of each terminal 20 fixed in the above-described manner is electrically connected to the distal end of a coil (not shown) located there below.

As described above, the present invention provides the following effects. Because the plurality of terminals are concentrically arranged in the open type holder and the plurality of clips are arranged between the terminals in the circumferential direction to be fastened thereto, the gap between the plurality of terminals and the insulation distance created by the gap can be maintained, thus improving the quality and performance of the terminal assembly for the hybrid vehicle motor.

Moreover, as the terminals are firmly fixed by the fastening force of the clips and more firmly fixed by the insulating material, which is molded over the top of the terminals and the clips, such an arrangement improves the binding force of the terminals.

Furthermore, the amount of the insulating material consumed during, the overmolding is reduced by the space occupied by the clips, thereby reducing reduce the manufacturing cost.

Although a preferred embodiment of the invention has been described using specific terms, such description is for illustrative purposes only, and it is to be understood that changes and variations may be made without departing from the spirit or scope of the following claims.

INCORPORATION BY REFERENCE

All patents, published patent applications and other references disclosed herein are hereby expressly incorporated by reference in their entireties by reference.

EQUIVALENTS

Those skilled in the art will recognize, or be able to ascertain using no more than routine experimentation, many equivalents of the specific embodiments of the invention described herein. Such equivalents are intended to be encompassed by the following claims.

What is claimed is:

1. A terminal assembly for a motor of a hybrid vehicle, the terminal assembly comprising:
- an open type holder with an open top;
- a plurality of terminals concentrically arranged and inserted into the holder; and
- a plurality of clips, each inserted between the terminals in an insulated manner to maintain a gap between adjacent terminals,
- wherein the open type holder further includes a bottom plate and a plurality of insertion holes formed on the bottom plate thereof at regular intervals in the circumferential direction such that the leg portion of each clip is inserted into each of the insertion holes.

2. The terminal assembly of claim 1, wherein:
- each of the clips includes a leg portion and a top plate,
- the leg portion having a plurality of legs and being inserted between the terminals;
- the top plate is placed on the top of the terminals, and
- the leg portion and the top plate are integrally molded with each other.

3. The terminal assembly of claim 2, wherein each of the clips further includes separation holes that are formed on the top plate, which corresponds to the boundary of the leg portion, the separation holes being formed by punching when the leg portion of the clip is inserted into the terminals.

4. The terminal assembly of claim 1, wherein the open type holder further includes an inner end and a plurality of fixing grooves formed at a top of the inner end at regular intervals in the circumferential direction such that a connection terminal extending vertically from each terminal is inserted into each fixing groove.

5. The terminal assembly of claim 1, further comprising an insulating material molded over the top of the clips and the terminals.

6. The terminal assembly of claim 1, wherein the terminals comprise one or more of a U-phase terminal, a V-phase terminal, a W-phase terminal, and an N-phase terminal.

7. The terminal assembly of claim 1, further comprising a multiplicity of clips.

8. A terminal assembly for a concentrated wiring electric motor, the terminal assembly comprising:
- an open type holder having an open top;
- a plurality of terminals concentrically arranged and inserted into the holder; and
- a plurality of clips, each of the plurality of clips being inserted between the terminals so as to maintain a gap between adjacent terminals and being circumferentially spaced from each other,
- wherein the open type holder further includes a bottom plate and a plurality of insertion holes that are formed in the bottom plate at regular intervals in the circumferential direction; and wherein the leg portion of each clip is inserted into the respective insertion hole.

9. The terminal assembly of claim 8, wherein each of the clips includes a leg portion and a top plate, the leg portion having a plurality of legs and wherein when said clips are being inserted, each leg portion is inserted between adjacent terminals and the top plate is disposed on the top of the terminals.

10. The terminal assembly of claim 9, wherein the leg portion and the top plate are integrally molded with each other.

11. The terminal assembly of claim 9, wherein each of the clips further includes separation holes that are formed in the top plate, which corresponds to the boundary of the leg portion, and wherein the separation holes are formed by punching when the leg portion of the clip is inserted into the terminals.

12. The terminal assembly of claim 8, wherein the open type holder further includes an inner end and a plurality of fixing grooves formed at a top of the inner end at regular intervals in the circumferential direction, wherein each terminal includes at least one connection terminal that extends vertically from each terminal, and wherein said at least one connection terminal is disposed in a respective fixing groove.

13. The terminal assembly of claim 8, further comprising an insulating material, the insulating material being molded over the top of the clips and the terminals.

14. The terminal assembly of claim 8, wherein the terminals comprise one or more of a U-phase terminal, a V-phase terminal, a W-phase terminal, and an N-phase terminal.

15. The terminal assembly of claim 8, further comprising a multiplicity of clips.

* * * * *